United States Patent
Jiang et al.

(10) Patent No.: US 10,253,263 B2
(45) Date of Patent: Apr. 9, 2019

(54) METHOD OF CONTINUOUS PYROLYSIS AND CARBONIZATION OF AGRICULTURAL AND FORESTRY BIOMASS

(71) Applicant: SOUTH CHINA AGRICULTURAL UNIVERSITY, Guangzhou (CN)

(72) Inventors: Enchen Jiang, Guangzhou (CN); Mingfeng Wang, Guangzhou (CN); Xinhui Guo, Guangzhou (CN); Xiwei Xu, Guangzhou (CN); Dongdong Shi, Guangzhou (CN); Shibo Li, Guangzhou (CN); Shijun Zhang, Guangzhou (CN)

(73) Assignee: SOUTH CHINA AGRICULTURAL UNIVERSITY, Guangzhou (CN)

( * ) Notice: Subject to any disclaimer, the term of this patent is extended or adjusted under 35 U.S.C. 154(b) by 156 days.

(21) Appl. No.: 15/322,128

(22) PCT Filed: Apr. 2, 2015

(86) PCT No.: PCT/CN2015/075784
§ 371 (c)(1),
(2) Date: Dec. 26, 2016

(87) PCT Pub. No.: WO2015/196841
PCT Pub. Date: Dec. 30, 2015

(65) Prior Publication Data
US 2017/0137715 A1    May 18, 2017

(30) Foreign Application Priority Data
Jun. 24, 2014    (CN) .......................... 2014 1 0290296

(51) Int. Cl.
*C10B 49/02*    (2006.01)
*C10B 47/20*    (2006.01)
(Continued)

(52) U.S. Cl.
CPC .............. *C10B 49/02* (2013.01); *C10B 47/20* (2013.01); *C10B 47/44* (2013.01); *C10B 53/02* (2013.01);
(Continued)

(58) Field of Classification Search
CPC ......... C10B 49/00; C10B 49/02; C10B 53/02; C10B 57/02; C10B 47/00
See application file for complete search history.

(56) References Cited

U.S. PATENT DOCUMENTS

2005/0247553 A1* 11/2005 Ichikawa ................... C10J 3/66
                                                              202/96

FOREIGN PATENT DOCUMENTS

CN    1935941       3/2007
CN    101691495    4/2010
(Continued)

OTHER PUBLICATIONS

Derwent abstract of CN 102703098, 1 page (2013).*
Derwent abstract of CN 102226092, 1 page (2011).*

*Primary Examiner* — Brian A McCaig
(74) *Attorney, Agent, or Firm* — JMB Davis Ben-David

(57) ABSTRACT

The invention belongs to the field of biomass energy utilization, and a continuous pyrolysis and carbonization method of agricultural and forestry biomass is disclosed. The method comprises the following steps: feeding biomass feedstock to a dryer for drying, then transporting to a continuous pyrolysis apparatus for pyrolyzing to obtain pyrolysis semicoke and pyrolysis volatiles; and transporting the pyrolysis semicoke to a carbonization apparatus for carbonization to obtain biomass charcoal and semi-coke carbonized volatiles; then discharging the pyrolysis volatiles and the semi-coke carbonized volatiles, and cooling to obtain tar, wood vinegar and pyrolysis gas; introducing the pyrolysis gas into a combustion apparatus for combustion to
(Continued)

obtain a high temperature flue gas; and finally transporting the high temperature flue gas into pyrolysis apparatus and carbonization apparatus for supplying heat, then the flue gas after supplying heat is delivered to the dryer and discharging tail gas. In the method, continuous and stable pyrolysis and carbonization of biomasses is realized, the pyrolysis step and the carbonization step are finished in the same system with separate step, transport efficiency is significantly increased, reaction conditions are steady and controllable, and the energy utilization efficiency is high.

10 Claims, 1 Drawing Sheet

(51) Int. Cl.
    *C10B 47/44*      (2006.01)
    *C10B 53/02*      (2006.01)
    *C10B 57/02*      (2006.01)

(52) U.S. Cl.
    CPC ............... *C10B 57/02* (2013.01); *Y02E 50/14* (2013.01); *Y02P 20/145* (2015.11)

(56) References Cited

FOREIGN PATENT DOCUMENTS

| CN | 101693845 | | 4/2010 | |
|---|---|---|---|---|
| CN | 102226092 | * | 10/2011 | ............. C10B 53/02 |
| CN | 102703098 | * | 10/2012 | ............. C10B 53/02 |
| CN | 104017590 | | 9/2014 | |
| WO | 2010130988 | | 11/2010 | |
| WO | 2012058218 | | 5/2012 | |

* cited by examiner

METHOD OF CONTINUOUS PYROLYSIS AND CARBONIZATION OF AGRICULTURAL AND FORESTRY BIOMASS

CROSS-REFERENCE TO RELATED APPLICATIONS

This is the U.S. National Stage of International Application No. PCT/CN2015/075784 filed on Apr. 2, 2015, which was published in Chinese under PCT Article 21(2), which in turn claims the benefit of Chinese Patent Application No. 201410290296.5 filed on Jun. 24, 2014.

TECHNICAL FIELD

The invention belongs to the field of biomass energy utilization and in particular relates to a method of continuous pyrolysis and carbonization of agricultural and forestry biomass.

BACKGROUND ART

China is rich in agricultural and forestry biomass resources, but biomass energy utilization has mainly relied on direct combustion for a long time, which not only has a low thermal efficiency, but also releases plenty of smoke dusts and residual ashes, thereby pollutes the environment heavily. In resent years, with the development of rural economy and the improvement of people's life standard, most of farmers tend to use convenient advanced energy, so that plenty of crop straws become waste and are abandoned in the field, even are burned on spot, which not only causes a great waste of resources, but also greatly threatens the environment and public traffic safety; furthermore, it becomes one of important factors which hinders the development of rural economy and society.

By means of pyrolysis technology, biomass can be converted into semicoke, combustible gas, tar and wood vinegar under high temperature and oxygen deprived conditions. This technology is a clean and high efficiency biomass energy conversion technology, wherein the pyrolysis reactor is the key part for realising the conversion. Currently, biomass pyrolysis reactors mainly have a plenty of types, such as fixed bed, fluidized bed, rotary kiln and spiral pyrolysis reactor and etc., wherein spiral pyrolysis reactor has the advantages of simple structure, maneuverable reaction conditions and continuous and stable operation.

Patent CN 101486921 A discloses a biomass continuous pyrolysis and carbonization apparatus with flexible spiral conveyor, wherein biomass feedstock is transported in the pyrolysis tube with spiral feeder and drying, pre-carbonization, carbonization and calcination reaction are finished therein, and the carbonization process is finished, the resulting biomass charcoal is cooled and collected or further processed after being discharged from the reactor. Since the process of biomass carbonization reaction is slow and time consuming, it needs to be remained in the pyrolysis tube for enough time to fully carbonize the raw material, and the processing capacity of the spiral pyrolysis reactor is greatly limited, and the processing efficiency is hard to be improved.

Patent application CN 102226092 A discloses a low-temperature pyrolytic carbonization method of agricultural and forestry waste and a carbonization furnace apparatus thereof, wherein the processing procedures are: pretreated biomass feedstock is fed into a drying apparatus for drying process, then the dried biomass is transported into a biomass pyrolytic carbonization apparatus while $N_2$ is charged, the biomass low-temperature pyrolytic carbonization process is gradually finished, and pyrolysis gas, biomass tar and biomass charcoal are generated. The procedure is characterized in that the biomass pyrolytic carbonization temperature is relatively low and between 200-300° C. The same as patent CN 101486921 A, the carbonization process is all finished during the spiral propelling type feeding, the processing efficiency is relatively low, and it needs to charge $N_2$ to maintain an anaerobic reaction environment during the reaction, which increases the cost of production.

Patent CN 102634358 A discloses an efficient selectable pyrolysis system and a using method thereof, wherein the system composition comprises a furnace body, a distiller, combustible gas nozzles and a cooling apparatus, and belongs to fixed bed pyrolysis process. During the process, firstly dried biomass feedstock is fed into the distiller. In the distiller, the material needs to be subjected to a pyrolysis and drying stage, pre-carbonization stage, pyrolytic carbonization stage, and cooling and collecting charcoal stage. In the stages, the heating time of the pyrolysis and drying stage is 10-20 minutes, the heating time of the pre-carbonization stage is 30-45 minutes, the heating time of the pyrolytic carbonization stage is 1-2 hours, wherein the time for the completion of feedstock carbonization is long. Although a plenty of gas nozzles is provided, which improves the temperature homogeneity in the reaction distiller to a certain extent, in the reaction distiller, temperature gradients will appear at both horizontal and longitudinal directions, which affects the homogeneity of pyrolysis charcoal quality. Not only does it consume time in the cooling and collecting char stage, but also the energy is not effectively used.

DISCLOSURE OF INVENTION

In order to overcome the disadvantages and deficiencies of continuous pyrolysis technologies and apparatuses in the prior art, the aim of the present invention is to provide a rapid and efficient method of continuous pyrolysis and carbonization of agricultural and forestry biomass, wherein the biomass is pyrolyzed and carbonized continuously, and the reaction condition is stable and controllable.

The purpose of the present invention is realized by following technical solutions:

a method of continuous pyrolysis and carbonization of agricultural and forestry biomass, using a continuous pyrolysis process to initially pyrolyze biomass, then using a fixed bed carbonization process to fully carbonize pyrolytic semicoke of the primary pyrolysis product, comprising the following steps in detail:

(1) transporting biomass feedstock into a drying oven for drying by a feeding apparatus;

(2) transporting the dried biomass feedstock to a continuous pyrolysis apparatus for pyrolysis by a feeding apparatus, wherein the resulting products are pyrolysis semicoke and pyrolysis volatiles;

(3) transporting the pyrolysis semicoke to a carbonization apparatus for carbonization to obtain biomass charcoal and semicoke carbonized volatiles; collecting the biomass charcoal;

(4) discharging the pyrolysis volatiles and the semicoke carbonized volatiles, and cooling same to obtain tar, wood vinegar and pyrolysis gas, and collecting tar and wood vinegar;

(5) transporting the pyrolysis gas into a combustion apparatus for combustion to obtain a high temperature flue gas;

(6) transporting the high temperature flue gas through a distribution valve into the pyrolysis apparatus and carbonization apparatus respectively for supplying heat to the pyrolysis apparatus and carbonization apparatus, then the flue gas after supplying heat is transported to the drying oven, thereby drying the biomass feedstock, and finally discharging tail gas.

The pyrolysis of step (2) and the carbonization of step (3) are performed continuously and subsequently, and after the material comes into the pyrolysis apparatus, the material is transported to the carbonization apparatus for carbonization while being pyrolyzed.

The biomass feedstock of step (1) is an organic biomass feedstock, comprising crop straws, cereal chaff, wood dust, leaves and branches with leaves; and the drying temperature is less than 200° C., and the drying time is 10-30 min.

The pyrolysis temperature of step (2) is 400-600° C., and the pyrolysis time is 3-8 min.

The carbonization temperature of step (3) is 500-800° C., and the carbonization time ≤30 min.

The drying medium of step (1) is the flue gas after supplying heat to the pyrolysis apparatus and carbonization apparatus, the flue gas comes into the drying oven for drying the feedstock after supplying heat to the pyrolysis apparatus and carbonization apparatus; and the flue gas is the product after the combustion of pyrolysis gas obtained after the pyrolysis and carbonization of the biomass feedstock.

The biomass charcoal of step (3) is transported to a charcoal storage apparatus from the carbonization apparatus, naturally cooled and discharged.

The pyrolysis volatiles the semicoke carbonized volatiles of step (4) are discharged into a condenser for condensation from the carbonization apparatus together.

The apparatus for realizing the method of continuous pyrolysis and carbonization of agricultural and forestry biomass is a continuous pyrolysis and carbonization apparatus of agricultural and forestry biomass, the apparatus comprises a feeding apparatus, a pyrolysis apparatus, a carbonization apparatus, and a heating apparatus for heating the pyrolysis apparatus and carbonization apparatus; the pyrolysis apparatus comprises a pyrolysis furnace, a pyrolysis tube throughout the pyrolysis furnace and a spiral conveyor provided inside the pyrolysis tube; the outlet end of the pyrolysis tube is connected to the carbonization apparatus; and the carbonization apparatus comprises a housing and a heat exchange tube provided inside the housing.

A built-in division plate inside the pyrolysis furnace is to extend the flue gas transferring path and enhance the heat exchange effect.

The heating apparatus comprises a combustion furnace, an oil-gas combustor and a distribution valve; the combustion furnace is provided inside the pyrolysis furnace, and the oil-gas combustor is provided outside the combustion furnace; the distribution valve has a heat inlet, two heat outlets and a valve distributing gases; the heat inlet of the distribution valve is connected to a flue gas outlet of the combustion furnace, the two heat outlets of the distribution valve are connected to the pyrolysis furnace in the pyrolysis apparatus and the heat exchange tube in the carbonization apparatus respectively.

The continuous pyrolysis and carbonization apparatus of agricultural and forestry biomass further comprises a drying oven, a pyrolysis feeding hopper and a transportation machinery; the material input end of the drying oven is connected to the output end of the feeding apparatus, and the material output end of the drying oven is connected to the input end of the transportation machinery; the output end of the transportation machinery is connected to the input end of the pyrolysis feeding hopper, and the output end of the pyrolysis feeding hopper is connected to the input end of the pyrolysis tube;

the drying medium inlet of the drying oven is connected to the pyrolysis furnace by a pipeline.

The inlet of the heat exchange tube in the carbonization apparatus is connected to the heat outlet of the distribution valve, and the outlet of the heat exchange tube is connected to the drying medium inlet of the drying oven.

The continuous pyrolysis and carbonization apparatus of agricultural and forestry biomass further comprises a condenser and a liquid collecting box; the material inlet of the condenser is connected to the carbonization apparatus, the liquid outlet of the condenser is connected to the inlet of the liquid collecting box, and the gas outlet of the condenser is connected to the gas fuel supply inlet of the oil-gas combustor.

The continuous pyrolysis and carbonization apparatus of agricultural and forestry biomass further comprises a gas storage tank and a three-way valve; the gas inlet of the gas storage tank, the gas outlet of the condenser and the gas fuel supply port of the oil-gas combustor are connected by the three-way valve, and the gas outlet of the gas storage tank is connected to the gas fuel supply inlet of the oil-gas combustor.

The continuous pyrolysis and carbonization apparatus of agricultural and forestry biomass further comprises an oil storage box; the output end of the oil storage box is connected to the liquid fuel input end of the oil-gas combustor.

The feeding apparatus comprises a feeding hopper and a feeding elevator, wherein the output end of the feeding elevator is connected to the material input end of the drying oven, and the input end of the feeding elevator is provided with the feeding hopper.

A charcoal storage box is provided at the bottom of the carbonization apparatus, and an inlet seal valve of the charcoal storage box and an outlet seal valve of the charcoal storage box are provided on the charcoal storage box.

The gas inlet of the gas storage tank is provided with a gas pump, and the gas outlet of the gas storage tank is provided with a gas control valve.

The drying oven is provided with a draft fan for drying, an air blower for drying and a drying oven seal valve; the drying oven seal valve is provided between the drying oven and the transportation machinery. When the drying oven seal valve is open, the air blower for drying stops working to prevent air from leaking into the continuous pyrolysis and carbonization apparatus.

The feeding elevator inclines upward at an angle of 30-60°; the feeding end of the feeding elevator is provided with a lifting motor.

The spiral conveyor is a pitch varied spiral conveyor and the screw pitch of the feeding end is relatively short. As the material is transported forward, the temperature is within the range of 150-250° C., the screw pitch is gradually increased to prevent the material from adhering, and within the range from 250° C. to the final temperature of the reaction, the screw pitch maintains constant. The material in the pyrolysis tube is in a half full state, which is favorable for the discharge of pyrolysis volatiles. (the length of different pitch screws is determined by the temperature range.)

The distribution valve controls the high temperature flue gas generated by the combustion of the fuel oil or pyrolysis gas. The distribution valve controls the proportion of the amount of the high temperature flue gas for the pyrolysis apparatus and carbonization apparatus, thereby controls the internal temperature of the pyrolysis apparatus and carbonization apparatus. The high temperature flue gas generated by the combustion of the pyrolysis gas exchanges heat with the pyrolysis tube of the pyrolysis apparatus to heat the pyrolysis tube, and the pyrolysis time is controlled by the transport motor and spiral conveyor according to different material properties.

The present invention has following advantages and effects as compared with the prior art:

(1) the present invention can realize continuous and stable pyrolysis and carbonization of biomass effectively and rapidly, the biomass pyrolysis stage and the carbonization stage are finished in the same system step-by-step, the primary pyrolysis is finished in the continuous pyrolysis apparatus, and most of volatiles are released out; the carbonization process is performed in the carbonization apparatus, partial volatiles remained in the semicoke are removed and biochar with a homogeneous quality is obtained. Since it does not need to finish carbonization in the continuous pyrolysis tube, the transport efficiency is significantly increased, and the processing efficiency of the pyrolysis system is further significantly increased.

(2) Pyrolysis and carbonization of biomass are finished in one reaction system by a two-step method, wherein using two sets of independent and controllable apparatus which are pyrolysis apparatus and carbonization apparatus, it can adjust system operation parameters, such as the temperatures and times of the pyrolysis and carbonization according to the feedstock and the quality requirements of product, thereby controlling the products distributions and qualities of three-phase products.

(3) The method has a strong adaptability for the size and moisture content of biomass, the continuous pyrolysis and carbonization apparatus uses the energy of the feedstock itself to dry biomass, and reduce the moisture of the material fed into the pyrolysis apparatus, enable the system to have a relatively good adaptability for high moisture material, use the adsorption property of biomass feedstock to filter organic volatiles and dusts in the combustion product of the pyrolysis gas, and purify the discharged flue gas.

SPECIFIC EMBODIMENTS

Hereafter the present invention will be further described in detail in conjunction with embodiments and appended drawings, but the embodiments of the present invention are not limited thereto.

Embodiment 1

A method of continuous pyrolysis and carbonization of agricultural and forestry biomass, comprising the following steps: the system is heated by the fuel oil in the oil storage box or the pyrolysis gas in the gas storage tank when being initiated, then begins to feed when the temperature reaches the set temperature.

Figure 1:
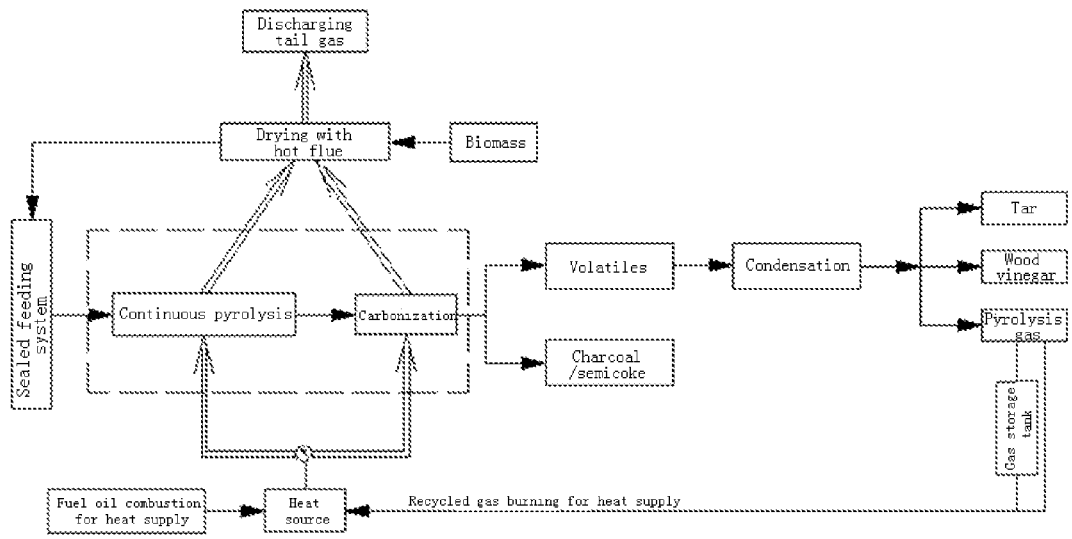
FIG. 1 is process flow diagram of the method of continuous pyrolysis and carbonization of agricultural and forestry biomass of the present invention.

Biomass feedstock is transported into the drying oven from the feeding hopper by the feeding elevator, the flue gas which has supplied heat to the pyrolysis apparatus and carbonization apparatus is used for drying the feedstock, the dried material is transported into the pyrolysis feeding hopper by the transportation machinery, then is transported to the carbonization apparatus by the pyrolysis spiral feeder in the pyrolysis tube; wherein the temperature in the pyrolysis tube generally is 400-600° C., and therefore the biomass feedstock in the pyrolysis tube is transported into the carbonization apparatus by the spiral conveyor while being pyrolyzed, i. e. in the transport process, the primary pyrolysis of the biomass feedstock is finished, and both pyrolysis volatiles and semicoke are transported to the carbonization apparatus, wherein the temperature of the carbonization apparatus generally is 500-800° C., after the semicoke is fully carbonized in the carbonization apparatus (the carbonization time is 10-30 min), biomass charcoal is generated, at this time point, the seal valve between the carbonization apparatus and the charcoal storage box is open, the biomass charcoal falls into the charcoal storage box and is discharged after being cooled (naturally cooled); the volatiles generated in the pyrolysis tube and carbonization apparatus are discharged from the top of the carbonization apparatus for the condensation treatment, then products of tar, wood vinegar and pyrolysis gas are obtained; tar and wood vinegar are collected, and pyrolysis gas is introduced into the combustion furnace for combustion through a pipeline, the generated high temperature flue gas comes into the heat exchange tube in the carbonization apparatus and the pyrolysis furnace in the pyrolysis apparatus for supplying heat through the distribution valve in the heating apparatus at an appropriate proportion, the flue gas discharged from the pyrolysis apparatus and carbonization apparatus is used for drying the feedstock before being discharged. When the temperature in the pyrolysis apparatus and carbonization apparatus reaches the set temperature, the pyrolysis gas is pumped into the gas storage tank by the gas pump through the three-way valve for standby application. When the generated pyrolysis gas cannot provide enough heat for the pyrolysis apparatus and carbonization apparatus, the pyrolysis gas in the gas storage tank is fed into the oil-gas combustor through the gas control valve, and the pyrolysis gas burns in the combustion furnace by the ignition apparatus of the oil-gas combustor to supply corresponding heat. Its process flow diagram is as shown in FIG. 1.

Figure 2:
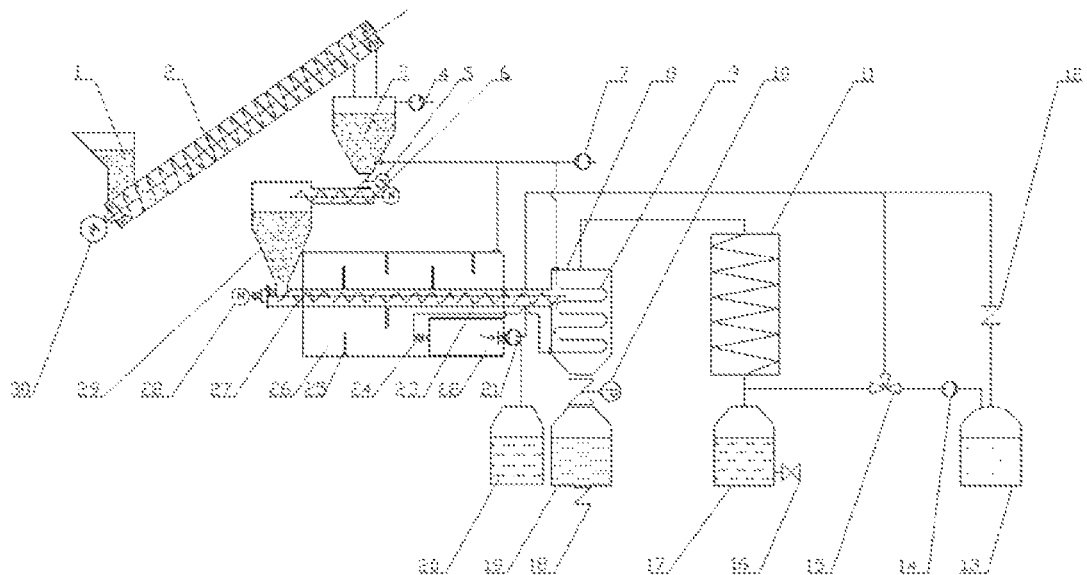
FIG. 2 is the schematic view of the continuous pyrolysis and carbonization apparatus of agricultural and forestry biomass; Wherein 1—a feeding hopper; 2—a feeding elevator; 3—a drying oven; 4—a draft fan for drying; 5—a drying seal valve; 6—a transportation machinery; 7—an air blower for drying; 8—a carbonization apparatus; 9—a heat exchange tube; 10—an inlet seal valve of charcoal storage box; 11—a condenser; 12—a gas control valve; 13—a gas storage tank; 14—a gas pump; 15—a three-way valve; 16—a draining valve; 17—a liquid collecting box; 18—an outlet seal valve of charcoal storage box; 19—a charcoal storage box; 20—an oil storage box; 21—an oil-gas combustor; 22—a combustion furnace; 23—a pyrolysis tube; 24—a distribution valve; 25—a division plate; 26—a pyrolysis furnace; 27—a spiral conveyor; 28—a transport motor; 29—a pyrolysis feeding hopper; 30—a lifting motor.

The schematic view of the continuous pyrolysis and carbonization apparatus of agricultural and forestry biomass is as shown in FIG. 2:

the continuous pyrolysis and carbonization apparatus of agricultural and forestry biomass comprises a feeding apparatus, a pyrolysis apparatus, a carbonization apparatus (8), and a heating apparatus for heating the pyrolysis apparatus and carbonization apparatus (8); the pyrolysis apparatus comprises a pyrolysis furnace (26), a pyrolysis tube (23) throughout the pyrolysis furnace and a spiral conveyor (27) built-in the pyrolysis tube (23); the outlet end of the pyrolysis tube (23) is connected to the carbonization apparatus (8). A division plate (25) is mounted inside the pyrolysis furnace (26). The carbonization apparatus (8) comprises a shell and a heat exchange tube (9) mounted inside the shell.

The heating apparatus comprises a combustion furnace (22), an oil-gas combustor (21) and a distribution valve (24); the combustion furnace (22) is built inside the pyrolysis furnace (26), and the oil-gas combustor (21) is installed outside the combustion furnace (22).

The distribution valve (24) has a heat inlet, two heat outlets and a valve distributing gases; the heat inlet of the distribution valve (24) is connected to a flue gas outlet of the combustion furnace (22), the two heat outlets of the distribution valve (24) are connected to the pyrolysis furnace (26) in the pyrolysis apparatus and the heat exchange tube (9) in the carbonization apparatus (8) respectively. The distribution valve (24) controls the temperature of the pyrolysis apparatus and carbonization apparatus (8) by adjusting the proportion of the amount of the high temperature flue gas introduced into the two apparatuses.

The continuous pyrolysis and carbonization apparatus of agricultural and forestry biomass further comprises a drying oven (3), a pyrolysis feeding hopper (29) and a transportation machinery (6); the material input end of the drying oven (3) is connected to the output end of the feeding apparatus, and the material output end of the drying oven (3) is connected to the input end of the transportation machinery (6); the output end of the transportation machinery (6) is connected to the input end of the pyrolysis feeding hopper (29), and the output end of the pyrolysis feeding hopper (29) is connected to the input end of the pyrolysis tube (23). The input end of the transportation machinery (6) is connected to the material output end of the drying oven (3) by the drying oven seal valve (5).

The drying medium inlet of the drying oven (3) is connected to the pyrolysis furnace (26) by a pipeline, and the drying medium inlet of the drying oven (3) is provided at one side of the drying oven (3) and near the bottom.

The inlet of the heat exchange tube (9) in the carbonization apparatus (8) is connected to the energy outlet of the distribution valve (24), and outlet of the heat exchange tube (9) is connected to the drying medium inlet of the drying oven (3), and the drying medium inlet of the drying oven (3) is provided at one side of the drying oven (3) and near the bottom.

The continuous pyrolysis and carbonization apparatus of agricultural and forestry biomass further comprises a condenser (11) and a liquid collecting box (17); the material inlet of the condenser (11) is connected to the carbonization apparatus (8), the liquid outlet of the condenser (11) is connected to the inlet of the liquid collecting box (17), the gas outlet of the condenser (11) is connected to the gas fuel supply inlet of the oil-gas combustor (21), and the liquid collecting box (17) is provided with a draining valve (16).

The continuous pyrolysis and carbonization apparatus of agricultural and forestry biomass further comprises a gas storage tank (13) and a three-way valve (15). The gas inlet of the gas storage tank (13), the gas outlet of the condenser (11) and the gas fuel supply inlet of the oil-gas combustor (21) are connected by the three-way valve (15), and the gas outlet of the gas storage tank (13) is connected to the gas fuel supply inlet of the oil-gas combustor (21). When the temperature of the pyrolysis apparatus and carbonization apparatus (8) is too high, the valve of the three-way valve (15) connecting the gas outlet of the condenser (11) and the gas fuel supply inlet of the oil-gas combustor (21) is closed, another valve of the three-way valve (15) connecting the gas outlet of the condenser (11) and the gas inlet of the gas storage tank (13) is open, and the pyrolysis gas is introduced into the gas storage tank (13) for storage by the gas pump (14); when the temperature of the pyrolysis apparatus and carbonization apparatus (8) is too low, the valve of the three-way valve (15) connecting the gas outlet of the condenser (11) and the gas fuel supply inlet of the oil-gas combustor (21) is open, and another valve of the three-way valve (15) connecting the gas outlet of the condenser (11) and the gas inlet of the gas storage tank (13) is closed, or the gas control valve (12) of the gas outlet of the gas storage tank (13) is open, to provide enough pyrolysis gas for the heating apparatus.

The continuous pyrolysis and carbonization apparatus of agricultural and forestry biomass further comprises an oil storage box (20); the output end of the oil storage box (20) is connected to the liquid fuel input end of the oil-gas combustor (21). The oil-gas combustor is an combustion apparatus of diesel oil and the pyrolysis gas, it is equipped with components for ignition and air distribution itself; wherein the flame generated by the combustion of the pyrolysis gas is inside the combustion furnace, i. e. the combustion furnace provides a space for the combustion of oil-gas and transports high temperature flue gas to the pyrolysis apparatus and carbonization apparatus. The oil-gas combustor is a dual-use oil-gas combustor which can burn diesel oil and pyrolysis gas, when the combustion of the pyrolysis gas cannot provide enough heat, diesel oil is burned for auxiliary heating.

The feeding apparatus comprises a feeding hopper (1) and a feeding elevator (2), wherein the output end of the feed elevator (2) is connected to the material input end of the drying oven (3) (i.e. the top of the drying oven), and the input end of the feeding elevator (2) is provided with the feeding hopper (1) (i.e. the bottom of the feeding hopper is connected to the input end of the feeding elevator).

A charcoal storage box (19) is provided at the bottom of the carbonization apparatus (8), and an inlet seal valve (10) of the charcoal storage box and an outlet seal valve (18) of the charcoal storage box are provided on the charcoal storage box (19).

The gas inlet of the gas storage tank (13) is provided with a gas pump (14), and the gas outlet of the gas storage tank (13) is provided with a gas control valve (12).

The drying oven is provided with a draft fan for drying (4), an air blower for drying (7) and a drying oven seal valve (5); the draft fan for drying (4) is provided at one side of the drying oven (3) and near the top, and the air blower for drying (7) is provided on the pipeline connecting to the drying medium inlet; the drying oven seal valve (5) is provided between the drying oven (3) and the transportation machinery (6). When the drying oven seal valve (5) is open, the air blower for drying (7) stops to prevent air from leaking into the continuous pyrolysis and carbonization apparatus.

The feeding elevator (2) inclines upward at an angle of 30-60°; the feeding end of the feed elevator is provided with a lifting motor (30). The feeding end of the pyrolysis tube (23) is provided with a transport motor (28).

As stated above, it can properly realize the present invention, the above-mentioned embodiments are only parts of embodiments of the present invention and are not intended to limit the scope of implementation of the present invention; i. e. the claimed range of the claims of the present invention covers all the equivalent changes and modifications which are made according to the content of the present invention.

The invention claimed is:

1. A method of continuous pyrolysis and carbonization of agricultural and forestry biomass, characterized in: using a continuous pyrolysis process to initially pyrolyze biomass, then using a fixed bed carbonization process to fully carbonize pyrolytic semicoke of a primary pyrolysis product, comprising the following steps in detail:
   (1) transporting biomass feedstock into a drying oven for drying by a feeding apparatus;
   (2) transporting the dried biomass feedstock to a continuous pyrolysis apparatus for pyrolysis by a feeding apparatus, wherein the resulting products are pyrolysis semicoke and pyrolysis volatiles;
   (3) transporting the pyrolysis semicoke to a carbonization apparatus for carbonization to obtain biomass charcoal and semicoke carbonization volatiles; collecting the biomass charcoal;
   (4) discharging the pyrolysis volatiles and the semicoke carbonization volatiles, cooling them to obtain tar, wood vinegar and pyrolysis gas, and collecting tar and wood vinegar;
   (5) feeding the pyrolysis gas into a combustion furnace for combustion to obtain a high temperature flue gas;
   (6) transporting the high temperature flue gas through a distribution valve into the pyrolysis apparatus and carbonization apparatus respectively for supplying heat to the pyrolysis apparatus and carbonization apparatus, then the flue gas after supplying heat is transported to the drying oven, thereby drying the biomass feedstock, and finally tail gas is discharged;
   wherein the pyrolysis of step (2) and the carbonization of step (3) are performed continuously and subsequently, and after the dried biomass feedstock comes into the pyrolysis apparatus, it is transported to the carbonization apparatus for carbonization by a spiral transporting rod while being pyrolyzed.

2. The method of continuous pyrolysis and carbonization of agricultural and forestry biomass according to claim 1, characterized in that:
   the drying temperature of step (1) is less than 200° C., and the drying time is 10-30 min;
   the pyrolysis temperature of step (2) is 400-600° C., and the pyrolysis time is 3-8 min;
   the carbonization temperature of step (3) is 500-800° C., and the carbonization time ≥30 min.

3. The method of continuous pyrolysis and carbonization of agricultural and forestry biomass according to claim 1, characterized in that: the drying medium of the drying oven of step (1) is the flue gas after supplying heat to the pyrolysis apparatus and the carbonization apparatus, the flue gas comes into the drying oven for drying the feedstock after supplying heat to the pyrolysis apparatus and carbonization apparatus; and the flue gas is the product from the combustion of pyrolysis gas obtained after the pyrolysis and carbonization of the biomass feedstock.

4. The method of continuous pyrolysis and carbonization of agricultural and forestry biomass according to claim 1, characterized in that: the biomass charcoal of step (3) is transported to a charcoal storage box from the carbonization apparatus, cooled naturally and discharged;
   and the pyrolysis volatiles and the semicoke carbonized volatiles of step (4) are discharged together from the carbonization apparatus into a condenser for condensation.

5. The method of continuous pyrolysis and carbonization of agricultural and forestry biomass according to claim 1, characterized in that: the apparatus used in the method of continuous pyrolysis and carbonization of agricultural and forestry biomass is a continuous pyrolysis and carbonization apparatus of agricultural and forestry biomass;
   the apparatus comprises a feeding apparatus, a pyrolysis apparatus, a carbonization apparatus, and a heating apparatus for heating the pyrolysis apparatus and carbonization apparatus; the pyrolysis apparatus comprises a pyrolysis furnace, a pyrolysis tube throughout the pyrolysis furnace and a spiral conveyor installed inside the pyrolysis tube; an outlet end of the pyrolysis tube is connected to the carbonization apparatus; and the carbonization apparatus comprises a shell and a heat exchange tube installed inside the shell.

6. The method of continuous pyrolysis and carbonization of agricultural and forestry biomass according to claim 5, characterized in that: the heating apparatus comprises the combustion furnace, an oil-gas combustor and the distribution valve; the combustion furnace is built inside the pyrolysis furnace, and the oil-gas combustor is installed outside the combustion furnace;
   the distribution valve has a heat inlet, two heat outlets and a gas distributing valve; the heat inlet of the distribution valve is connected to a flue gas outlet of the combustion furnace, the two heat outlets of the distribution valve are connected to the pyrolysis furnace in the pyrolysis apparatus and the heat exchange tube in the carbonization apparatus respectively.

7. The method of continuous pyrolysis and carbonization of agricultural and forestry biomass according to claim 5, characterized in that: the continuous pyrolysis and carbonization apparatus of agricultural and forestry biomass further comprises the drying oven, a pyrolysis feeding hopper and a spiral conveyor; a material input end of the drying oven is connected to an output end of the feeding apparatus, and a material output end of the drying oven is connected to an input end of the spiral conveyor; an output end of the spiral conveyor is connected to an input end of the pyrolysis feeding hopper, and an output end of the pyrolysis feeding hopper is connected to an input end of the pyrolysis tube.

8. The method of continuous pyrolysis and carbonization of agricultural and forestry biomass according to claim 7, characterized in that: a drying medium inlet of the drying oven is connected to a gas outlet of the pyrolysis furnace and an outlet of the heat exchange tube by pipelines respectively.

9. The method of continuous pyrolysis and carbonization of agricultural and forestry biomass according to claim 5, characterized in: further comprising a condenser and a liquid collecting box; wherein a material inlet of the condenser is connected to the carbonization apparatus, a liquid outlet of the condenser is connected to an inlet of the liquid collecting box, and a gas outlet of the condenser is connected to a fuel supply inlet of the oil-gas combustor.

10. The method of continuous pyrolysis and carbonization of agricultural and forestry biomass according to claim 5, characterized in: further comprising a gas storage tank and a three-way valve; wherein a gas inlet of the gas storage tank, the gas outlet of the condenser and the fuel supply inlet of the oil-gas combustor are connected by the three-way valve, and gas outlet of the gas storage tank is connected to the fuel supply inlet of the oil-gas combustor.

* * * * *